United States Patent [19]

Takiguchi et al.

[11] 4,064,313
[45] Dec. 20, 1977

[54] HEAT FIXING MEMBER FOR ELECTROPHOTOGRAPHIC COPIERS

[75] Inventors: Koichi Takiguchi, Fairport, N.Y.; Teruhiko Itami, Tokyo, Japan

[73] Assignee: Rank Xerox Ltd., London, England

[21] Appl. No.: 751,825

[22] Filed: Dec. 17, 1976

[51] Int. Cl.² .................. B32B 15/08; G03G 13/20; C09J 3/14
[52] U.S. Cl. .................. 428/447; 29/132; 118/60; 156/329; 156/308; 156/309; 427/407 R; 427/407 C; 427/409; 427/22; 428/450; 428/469; 432/60
[58] Field of Search .............. 428/447, 36, 450, 469; 427/22, 407 R, 407 C, 409; 29/132; 432/60; 118/60; 156/329, 308, 309

[56] References Cited

U.S. PATENT DOCUMENTS

| | | | |
|---|---|---|---|
| 2,860,083 | 11/1958 | Nitzsche | 156/329 |
| 3,087,832 | 4/1963 | Fogle | 428/447 |
| 3,225,419 | 12/1965 | Milton | 29/132 |
| 3,511,729 | 5/1970 | Williams | 29/132 |
| 3,686,731 | 8/1972 | Koori | 156/329 |
| 3,772,122 | 11/1973 | Young | 428/447 |

FOREIGN PATENT DOCUMENTS

| | | | |
|---|---|---|---|
| 778,348 | 7/1957 | United Kingdom | 156/329 |

*Primary Examiner*—Ellis Robinson
*Attorney, Agent, or Firm*—James J. Ralabate; Ernest F. Chapman

[57] ABSTRACT

Silicone rubber is employed as a coating material on a fuser member and adhered to the base member by means of a novel polysiloxane composition. The novel polysiloxane composition comprises specified quantities of two moieties of organopolysiloxane, an allyl ester of a polybasic acid, an aliphatic salt of a metal, and a silane, and strongly adheres the silicone rubber outer layer to the base member or core even when silicone oil is used as a release agent on the fuser member.

8 Claims, 1 Drawing Figure

HEAT FIXING MEMBER FOR ELECTROPHOTOGRAPHIC COPIERS

BACKGROUND OF THE INVENTION

This invention relates generally to members utilized for pressure fusing toners at elevated temperatures, and more particularly to improved heat fixing rolls for preventing offsetting of dry toners onto the roll during the fusing operation in electrophotographic copiers.

In the process of electrophotographic copying a light image of an original to be copied is typically recorded in the form of a latent electrostatic image upon a photosensitive member with subsequent rendering of the latent image visible by the application of electroscopic particles, commonly referred to as toner. The visual toner image can be either fixed directly upon the photosensitive member or transferred from the member to another support, such as a sheet of plain paper, with subsequent affixing of the image thereto. Toners are well known in the art and may be of various types.

In order to affix or fuse electroscopic toner material onto a support surface permanently by heat, it is necessary to elevate the temperature of the toner material to a point at which the constituents of the toner material coalesce and become tacky. This action causes the toner to flow to some extent into the fibers or pores of support sheets or members or otherwise upon the surface thereof. Thereafter, as the toner material cools, solidification of the toner material occurs causing the toner material to be bonded firmly to the support sheet or member. In both the xerographic as well as the electrographic recording arts, the use of thermal energy for fixing toner images onto a support member is old and well known.

Several approaches to thermal fusing of electroscopic toner images onto a support have been described in the prior art and include providing the concomitant application of heat and pressure as by a roll pair maintained in pressure contact, a flat or curved plate member in pressure contact with a roll, a belt member in pressure contact with a roll, and the like. Heat may be applied by heating one or both of the rolls, plate members or belt members. The fusing of the toner takes place when the proper combination of heat, pressure and contact time are provided, the balancing of these parameters being well known in the art and varying according to various factors which must be independently determined for each particular situation.

During operation of a fusing system of the type where there is a thermal fusing of electroscopic toner images onto a support in which at least one fuser member, such as a roll, plate or belt, is heated, the support member to which the toner images are electrostatically adhered, is moved through the nip formed between the members with the toner image pressure contacting the fuser roll thereby to effect heating of the toner images within the nip. By controlling the heat transfer to the toner, virtually no offset of the toner particles from the copy sheet to the fuser member is experienced under normal conditions. This is because the heat applied to the surface of the fuser member is insufficient to raise the temperature of the surface of the member above the "hot offset" temperature of the toner at which temperature the toner particles in the image areas of the toner liquify and cause a splitting in the molten toner resulting in "hot offset". Splitting occurs when the cohesive forces holding the viscous toner mass together is less than the adhesive forces tending to offset it to a contacting surface such a fuser roll, fuser belt, or fuser plate.

Occasionally, however, toner particles will be offset to the fuser roll by an insufficient application of heat to the surface thereof (i.e. "cold" offsetting); by imperfection in the properties of the surface of the roll; by the toner particles insufficiently adhering to the copy sheet; by the electrostatic forces which normally hold them there; or in certain cases by the reactivity of the toner material itself. In such a case, toner particles may be transferred to the surface of the fuser member with subsequent transfer to the backup member which provides pressure contact, during periods of time when no copy paper is in the nip.

In many of these pressure contact, heat fixing systems, a heated member, e.g. a roll, provided with a covering of a heat-resistant, releasing material on the outer surface thereof is contacted with a back-up or pressure roll covered with a heat-resistant, flexible material layer under nip pressure, between which the sheet to be fixed is passed for fixing the toner image.

As an example of the heat-resistant, release material for the fuser member, there are well known materials such as polytetrafluoroethylene, silicone rubber, fluorocarbon elastomers and the like. In certain cases, a suitable off-set preventing liquid is fed onto the fuser member to minimize or avoid such problems as "offsetting". Silicone oils are widely applied as the off-set preventing liquid.

In the pressure contact heat fixing device of the type described above, the fuser member is covered with a certain thickness of heat-resistant silicone rubber which releases toner material and has an elastic, compressible surface. When silicone rubber is used as the outer layer of the fuser member, the fused image has excellent quality.

The silicone rubbers which can be used as the outer layer coating the base or core of the fuser member, can be classed into three groups according to vulcanization method and temperature, i.e., room temperature vulcanization-type silicone rubber, hereinafter referred to as RTV silicone rubber, low temperature vulcanization-type silicone rubber, hereinafter referred to as LTV rubber, and high temperature vulcanization-type silicone rubber, hereinafter referred to as HTV rubber. These silicone rubbers are well known in the art and are commercially available.

When employed as a fuser member covering material, the RTV and LTV silicone rubbers are generally superior in releasing property to the HTV silicone rubber and thus generally produce favorable results in fusing toner images. The RTV silicone rubbers now commercially available exhibit excellent release of toner images for about 5,000 to 30,000 copies fused by heat. Thereafter, there is a tendency for the off-set problem and winding of copying paper about the fuser roll to occur. When this occurs, it is necessary to replace the used fuser roll.

To overcome the foregoing problems it is well known that silicone oil may be applied to the surface of the fuser member (upon the silicone rubber layer) as an off-set preventing liquid during fixing operations. However, when silicone rubber is used as a heat-resistant, release layer to cover the fuse member, the use of silicone oil is disadvantageous in that the silicone rubber is susceptible to swelling by the action of the silicone oil, so that the oil readily penetrates the rubber, resulting in separation of the rubber from a base or core. Thus, the application of silicone oil is effective in improving the release characteristics, but it sacrifices the durability of the silicone rubber layer covering the fuser member. For this reason, silicone rubber coated fuser members have a short life time and generally permit no more than about 30,000 fusing cycles per fuser member.

OBJECTS OF THE INVENTION

Accordingly, it is the principal object of this invention to provide a new and improved silicone rubber coated fuser member for use in fuser assemblies in xerographic copying machines which overcome the foregoing disadvantages.

Another object of the present invention is to provide a fuser member which has a heat resistant, silicone rubber surface layer or coating as a release material for toner images in which no separation occurs between the base or core and the silicone rubber layer when silicone oil is fed or metered on the silicone rubber.

Still another object of the invention is to provide a silicone rubber coated fuser member having an improved life.

SUMMARY OF THE INVENTION

The above-cited objects of the present invention are accomplished by a fuser member for pressure fusing toned electrostatic images at elevated temperatures, comprising a base member or core, a layer of a polysiloxane material coated on the base member or core surface and an outer layer of an RTV; LTV or HTV silicone rubber coated upon the layer of polysiloxane material, the outer layer being vulcanized after it is placed upon the layer of polysiloxane material. The layer of polysiloxane material formed upon the base member or core surface must be one which promotes the adhesion of the silicone rubber to the base member or core surface.

We have found that when a silicone rubber coating or layer and a base member or core are adhered to each other by means of a novel polysiloxane composition having the following formulation, the resultant pressure contact heated fuser member has an extended life and the adhesion of the silicone rubber layer to the base member or core does not fail when silicone oil is applied to the surface of the fuser. The polysiloxane composition intermediate the silicone rubber layer and the base member comprises:

a. 100 parts by weight of an organopolysiloxane expressed by the empirical formula, $R^1_n SiO_{4-n/2}$ wherein $R^1$ represents a substituted or unsubstituted monovalent hydrocarbon group, at least 80 mole percent of $R^1$ being a methyl group and having no more than 0.2 mole percent of an aliphatic unsaturated group, and $n$ is a positive numerical value of from 1.98 to 2.01, and having a viscosity greater than 100,000 centistokes at 25° C;

b. 5 to 100 parts by weight of an organopolysiloxane expressed by the empirical formula, $R^2_m SiO_{4-m/2}$ wherein $R^2$ represents a substituted or non-substituted monovalent hydrocarbon, 3 to 25 mole percent of $R^2$ being a vinyl group, and $m$ is a positive numerical value of from 1.9 to 2.3, and having a viscosity of from 5 to 10,000 centistokes at 25° C;

c. 1 to 80 parts by weight of an allyl ester of a polybasic acid;

d. 3 to 20 parts by weight of an aliphatic acid salt of a metal; and e. 0.2 to 2.0 parts by weight of a silane compound expressed by the general formula, $R^3Si(OR)^4{}_3$, wherein $R^3$ represents an unsaturated hydrocarbon group and $R^4$ represents a member selected from the group consisting of a methyl group, a β-methoxyethyl group, a β-ethoxyethyl group and a tertiary-butylperoxy group.

The polysiloxane composition may further comprise for example, finely powdered silica to improve the mechanical strength thereof, or ferric oxide or cerium oxide to improve heat resistance. Upon application of the composition onto a base member for example, a roll core surface, suitable solvents may be added to the composition for controlling the viscosity of the composition. Examples of the solvents include benzene, toluene, xylene, trichloroethylene, perchloroethylene, methylene chloride, ethanol, isopropanol, butanol, n-hexane and the like. These solvents may be used separately or in combination with each other.

The polysiloxane composition may be employed as an adhesive for coating not only a single layer of a silicone rubber upon the base member, but also multiple silicone rubber layers with each other to form a plurality of silicone rubber layers upon the base member.

These as well as other objects of the invention and further features thereof will be better understood upon reference to the following detailed description of the invention when read in conjunction with the accompanying drawings.

DESCRIPTION OF THE PREFERRED EMBODIMENTS

Figure 1:
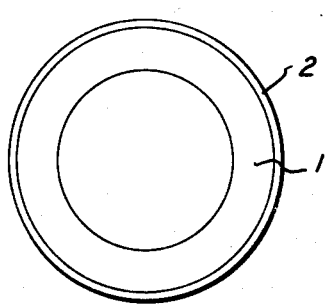
FIG. 1 represents a cross-sectional view of a conventional prior art fuser roll having a layer of self-adhesive silicone rubber on the core surface.

The fuser embodiments of the present invention may be used in an automatic xerographic reproducing machine, such as the automatic xerographic reproducing machine described in U.S. Pat. No. 3,937,637, said patent being incorporated herein by reference. Therein is illustrated a reproducing machine which employs an image recording drum-like member, the outer periphery of which is coated with a suitable photoconductive material. One type of photoconductive material is disclosed in U.S. Pat. No. 2,970,906 issued to Bixby in 1961. The photoconductive drum is suitably journaled for rotation within a machine frame by means of a shaft which rotates to bring the image retaining surface thereon past a plurality of xerographic processing stations. Suitable drive means are provided to power and coordinate the motion of the various cooperating machine components whereby a faithful reproduction of the original input scene information is recorded upon a sheet of final support material such as paper or the like.

Since the practice of xerography is well known in the art, the various processing stations for producing a copy of an original are represented as stations A to E. Initially, the drum moves the photoconductive surface through a charging station A. At charging station A an electrostatic charge is placed uniformly over the photoconductive surface of the drum preparatory to imaging. The charging may be provided by a corona generating device of a type described in U.S. Pat. No. 2,836,725 issued to Vyverberg in 1958.

Thereafter, the drum is rotated to exposure station B where the charged photoconductive surface is exposed to a light image of the original input scene information, whereby the charge is selectively dissipated in the light exposed regions to record the original input scene in the form of a latent electrostatic image. A suitable exposure system may be provided by one skilled in the art.

After exposure the photoconductive drum rotates the electrostatic latent image recorded on the photoconductive surface to development station C, wherein a conventional developer mix is applied to the photoconductive surface rendering the latent image visible. A suitable development station may include a magnetic brush development system utilizing a magnetizable developer mix having carrier granules and toner comprising electrophotographic resin plus colorant from dyes or pigments. A developer mix is continually brought through a directional flux field to form a brush thereof. The electrostatic latent image recorded on the photoconductive surface is developed by bringing the brush of developer mix into contact therewith. The developed image on the photoconductive surface is then brought into contact with a sheet of final support material within a transfer station D and the toner image is transferred from the photoconductive surface to the contacting side of a final support sheet. The final support material may be plain paper, gummed labels, transparencies such as polycarbonate, polysulfone and Mylar, etc., as desired.

After the toner image has been transferred to the sheet of final support material, the sheet with the image thereon is advanced to a suitable fuser assembly which fuses the transfer powder image thereto. After the fusing process, the final support material is advanced by a series of rolls to a copy paper tray for subsequent removal therefrom by a machine operator.

Although most of the toner powder is transferred to the final support material, some residual toner remains on the photoconductive surface after the transfer of the toner powder image to the final support material. The residual toner particles remaining on the photoconductive surface after the transfer operation are removed from the drum as it moves through cleaning station E. Here the residual toner particles may first be brought under the influence of a cleaning corona generating device adapted to neutralize the electrostatic charge remaining on the toner particles. The neutralized toner particles are then mechanically cleaned from the photoconductive surface by conventional means as for example, the use of a resiliently biased knife blade. Other cleaning modes may be used at cleaning station E as desired by one skilled in the art.

It is believed that the foregoing description is sufficient for purposes of the present application to illustrate the general operation of a preferred automatic xerographic copier which can embody the teachings of the present invention.

As discussed above, fuser assemblies include cylindrical rolls, flat plates, curved plates, belts and the like having at least an outer surface of silicone rubber.

A typical prior art fuser roll as shown in FIG. 1, comprises fuser roll core 1 and layer 2 made of a self-adhesive RTV silicone rubber which is a heat-resistant release material placed upon or formed around core 1.

Figure 2:
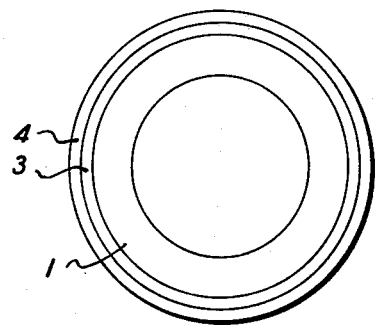
FIG. 2 represents a cross-sectional view of another conventional prior art fuser roll having a primer undercoat layer and an outer coating of silicone rubber.

In FIG. 2, there is shown another prior art fuser roll which comprises fuser roll core 1, primer undercoat layer 3 and outer layer 4 of a RTV, LTV or HTV silicone rubber placed upon or formed around the outer surface of core 1 in the order shown, outer layer 4 being vulcanized after it is placed upon core 1. The prior art primer material which is used for adhering silicone rubber to a roll core includes, for example, a silane having an unsaturated bond such as vinyltrimethoxysilane, gamma-methacryloxypropyltrimethoxysilane, vinyltris(b-butylperoxy)silane and the like, or a partially hydrolyzed condensate thereof.

The present invention is described in detail with reference to FIGS. 3 and 4. As shown in the drawings and preferred embodiments, the invention is described in the form of a fuser roll, however, the invention is also applicable to the fuser member configurations described above.

According to the present invention, there is provided a fuser roll 10 which comprises a heated roll core 1 (heating element not shown), a layer 5 of a polysiloxane composition placed upon or formed on the surface of core 1, and outer covering layer 4 of a RTV, LTV or HTV rubber placed upon or formed around layer 5, outer covering layer 4 being vulcanized after it is placed upon or formed around layer 5.

Figure 4:
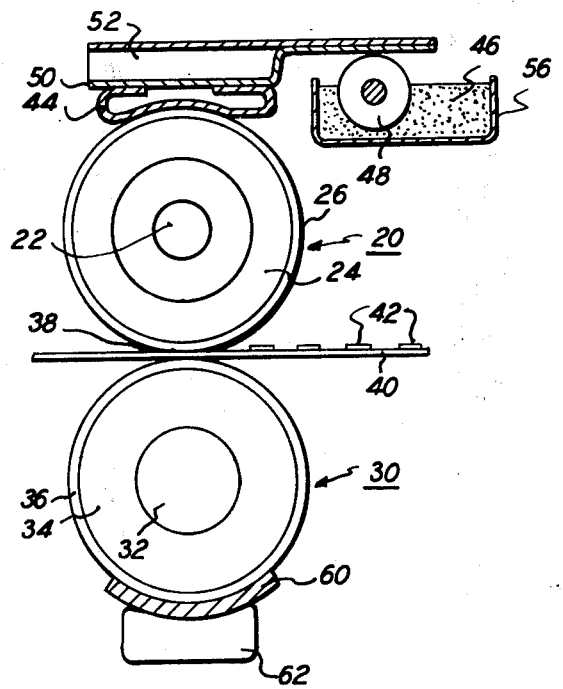
FIG. 4 is a schematic representation of a pressure contact fuser assembly which can employ the fuser members (rolls) of the present invention.

FIG. 4 shows a pressure contact heated fuser assembly having fuser roll 20 which comprises heating element 22, metal core 24 accommodating therein heating element 22, and outer layer or coating 26 made of a heat-resistant, release material placed upon or formed around metal core 24. The fuser assembly of FIG. 4 also comprises pressure roll 30 made of a heat-resistant, flexible surface material and which comprises metal core 32, silicone rubber layer 34 formed around or coated upon core 32, and polyfluoroethylenepropylene layer 36 covering silicone rubber layer 34. The fuser roll 20 and the pressure roll 30 contact and cooperate with each other by a suitable mechanism (not shown) so that a suitable pressure is applied on a nip line designated by numeral 38. Sheet 40 bearing thereon toner image 42 is passed between rolls 20 and 30. On fuser roll 30 is mounted an intermediate oil-feeding member 44 from which a silicone oil 46, an off-set preventing liquid, is fed to the fuser roll 20 and which also serves to clean the fuser roll 20. The silicone oil 46 in sump 56 is fed to the oil-feeding member 44 through another intermediate oil-feeding member 50 by means of feeding roll 48. Indicated at 52 is a weight for pressing oil-feeding member 44 against silicone rubber layer (outer layer) 26. The pressure roll 30 is contacted with a cleaning member 60 held on a supporting member 62.

The fuser roll body or core which is suitable for coating with the polysiloxane composition layer can be made of various kinds of metals such as iron, aluminum, nickel, chromium, copper, and the like, and alloys thereof, such as stainless steel, brass, and the like, and various synthetic resins. Of these, iron, aluminum, copper, stainless steel, brass and the like materials are preferred. One skilled in the art can select an appropriate core material.

The method of providing the necessary heat is not critical in the present invention and the fuser members can be heated by internal means, external means or both, all heating means being well known in the art for providing sufficient heat to fuse toner to its substrate.

A preferred fuser assembly comprises a heated roll structure having a hollow core. The heated roll structure includes a hollow cylinder or core having a suitable heating element disposed in the hollow portion thereof which is coextensive with the cylinder. The heating element may comprise any suitable type heater for elevating the surface temperature of the cylinder to operational temperatures therefor, for example, 200°-450° F. For example, it may be a quartz lamp.

In one preferred working embodiment, the resulting fuser roll structure has an outside diameter on the order of 1.5 to 3.0 inches and has a length on the order of 10 to 15 inches. Power requirements for the foregoing are 500-2500 watts peak power with an average power of 300-2000 watts and 75-250 watts for standby. The surface temperature of the fuser member structure may be controlled by contacting the surface thereof with a thermistor probe as described in U.S. Pat. No. 3,327,096, issued to Bernous.

The pressure roll or backup roll structure which cooperates with the fuser roll structure to form a nip through which a copy paper or substrate passes such that toner images thereon contact the fuser roll structure, may comprise any suitable construction, for example, a steel cylinder, but preferably comprises a rigid steel core having a Viton elastomer surface or layer thereon. A preferred backup roll has a core approximately 1.8 inches in diameter with a 0.1 inch cover or layer structure of Viton elastomer or other suitable high temperature elastomeric layer structure, for example, silicone rubber and a combination of Viton or silicone rubber with Teflon thereon. Viton is the trademark of Dupont Co. The specific dimensions of the members making up the backup roll will be dictated by the requirements of the particular copying apparatus wherein the fuser assembly is employed, the dimensions being greater or less depending upon the process speed of the machine.

The thickness of the silicone rubber or layers of silicone rubber and the thickness of the layer or layers of polysiloxane adhesive composition are not critical in the practice of the present invention. Generally, where the fuser member is heated by internal means, the silicone rubber and the polysiloxane adhesive material are preferably of such thicknesses as to constitute a minimal thermal barrier to heat radiating from inside the fuser member to the outermost layer of silicone rubber. Recommended combined thicknesses in this case range from about 1 mil (.0025 cm.) to about 200 mils (0.5 cm.), the most preferred range being about 5 mils (0.12 cm.) to about 90 mils (0.22 cm.).

The advantages of the present invention were confirmed by comparative life tests wherein several fuser rolls using different kinds of polysiloxane adhesive compositions and silicone rubbers were used and are described in detail in the Examples. The fuser rolls having the structures as described hereinbefore were placed in a pressure contact fuser assembly of the type shown in FIG. 4. The various fuser rolls were substituted in the fuser assembly after the previous roll failed.

The term "life" or "lifetime" as used herein refers to the number of reproduced copies until the heat-resistant, release layer of silicone rubber deteriorated in release characteristics resulting in off-set or winding of copying paper around the fuser roll in cases where no silicone oil is fed to the roll surface. In those tests where a silicone oil was used, the lifetime is defined as a number of reproduced copies until the heat-resistant, release layer 26 of silicone rubber (FIG. 4) is either reduced in mechanical strength and having an irregular surface, or separated from the fuser roll core 24 by the action of the silicone oil, which makes it impossible to continue the copying (fusing) operation. In tests where silicone oil was not used, the silicone oil-feeding system including the intermediate oil-feeding member 44, the roll 48, the silicone oil 46, the feeding roll 48, the container or sump 56 and the weight 52 were eliminated from the fuser assembly of FIG. 4.

For comparative testing, two conventional fuser rolls were made. The fuser rolls were of the type shown in FIG. 1 and were made by applying a conventional self-adhesive single liquid RTV silicone rubber identified as KE-45RTV, a product of Shinetsu Chemical Co., onto the outer surface of an aluminum core 1 in a thickness of 400 microns (15.75 mils) to form a heat-resistant, release material layer 2 around the core. The fuser roll was then mounted in the fuser assembly of FIG. 4 and subjected to the above lifetime test using no silicone oil. Failure occurred when a copying sheet (paper) wound around the roll after making 470 copies. When the above process was repeated using a silicone oil metered onto the surface of the roll, the lifetime corresponded to 3,000 copies, at which point the heat-resistant, release material layer 2 was separated from the aluminum core 1.

Another conventional fuser roll of the type shown in FIG. 2 was made by applying onto the aluminum core 1 vinylperoxysilane ($CH_2 = CHSi(OOC(CH_3)_3)_3$) primer designated by numeral 3 in FIG. 2. Then 400 microns (12.75 mils) of a RTV silicone rubber identified as KE-12RTV, a product of Shinetsu Chemical Co., was applied to form a heat-resistant, release material layer 4 around the core. This fuser roll was subjected to a lifetime test without the use of any silicone oil. Failure occurred when a copying sheet (paper) wound around the roll after the reproduction of 16,500 copies.

The following examples further define, describe and compare fuser rolls prepared by the present invention and illustrate the preferred embodiments of the present invention.

EXAMPLE I

Figure 3:
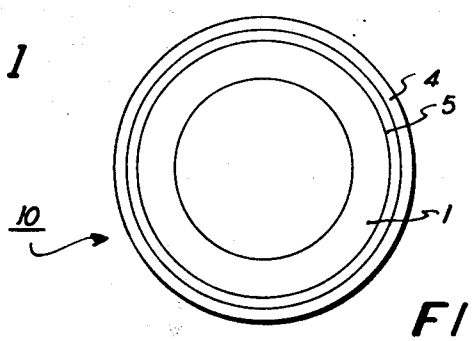
FIG. 3 represents a cross-sectional view of the fuser roll of the present invention having the polysiloxane adhesive layer of the present invention and an outer coating of silicone rubber.

A layer of a polysiloxane composition was placed around (spread upon) aluminum core 1 as shown in FIG. 3 to be a primer composition. This primer composition was obtained by uniformly dissolving or dispersing 100 parts by weight of dimethylsiloxane having a viscosity of about 5,000,000 centistokes at 25° C and having a vinyldimethylsilyl group at each end of the molecular chain; 50 parts by weight of methylvinylpolysiloxane having a viscosity of 500 centistokes at 25° C and 90 mole percent of dimethylsiloxane units and 10 mole percent of methylvinylsiloxane units, and terminated with a trimethylsilyl group at each end of the molecular chain; 60 parts by weight of vinyltris-(β-methoxyethoxy)silane; 50 parts by weight of diallyl succinate; 10 parts by weight of tin octoate and 2 parts by weight of iron oxide red in a mixed solvent composed of 600 parts by weight of toluene, 200 parts by weight of trichloroethylene and 200 parts by weight of isopropanol. After being dried in the air, the foregoing polysiloxane composition layer was covered with a silicone rubber identified as KE 530 U HTV, a product of Shinetsu Chemical Co., in a thickness of 400 microns (15.75 mils) and was then subjected to a cross-linking treatment by any of the conventional methods to form a heat-resistant cross-linked silicone rubber layer 4 on the primer layer 5. When the life of the resultant fuser roll was tested without feeding any silicone oil, off-set took place from the beginning (initial copy). Thus, there was immediate failure due to hot offsetting.

When a silicone oil was fed onto the roll, the heat-resistant silicone rubber layer 4 did not separate from the aluminum core 1 until 65,000 copies had been fused.

EXAMPLE II

Example I was repeated using the polysiloxane composition having 1.0 percent by weight of ferric oxide powder added thereto. When a silicone oil was applied, no separation of rubber and core took place until 120,000 copies were fused. The addition of ferric oxide was very effective especially in the range of about 0.1 – 10 percent by weight of the polysiloxane adhesive composition.

EXAMPLE III

Example I was repeated using the polysiloxane composition having 1.0 percent by weight of cerium oxide powder added thereto. When a silicone oil was applied, no separation of silicone rubber from the core occurred until 165,000 copies were fused. The addition of cerium oxide was very effective in the range of about 0.1 – 10 percent by weight of the polysiloxane adhesive composition.

EXAMPLE IV

Example I was repeated except that the polysiloxane compositions of Examples II and III were used, respectively, and that a silicone rubber identified as KE-555 U HTV, a product of Shinetsu Chemical Co., which had excellent mechanical strength, was used as the silicone rubber to form a 400 micron (14.75 mil) heat-resistant covering layer 4. When a silicone oil was applied in the fuser roll, the life of the resultant heat fixing roll corresponded to 200,000 copies. In the above Examples, the fuser roll 20 and the pressure roll 30 each had an outer diameter of 30 mm, the silicone oil employed was identified as KF-96, a product of Shinetsu Chemical Co., and the oil having a viscosity of 350 cs at 25° C was fed in an amount of 0.04 cc/copy.

The surface temperature of the fuser roll was set at 160° C by suitably controlling the electric power for a tube-type infrared ray lamp (having rated voltage and power of 100 volts and 1000 watts respectively) by a temperature control means (not shown). The toner fused was identified as 2400 Toner, a product of Fuji Xerox Co. Copying paper was paper identified as No. L-1, a product of Fuji Xerox Co.

Though it is known that a fluorosilicone rubber or a fluorine-containing rubber (elastomer) has excellent resistance to silicone oil, we confirmed that such rubber has poor release characteristics to toner when used alone. Further, it was confirmed that the combination of these rubbers with a silicone rubber exhibiting good release characteristics is disadvantageous in that the fluorosilicone rubber or fluorine-containing rubber has very poor adherence to the silicone rubber, and the combined rubbers are readily separated from each other at the combined surfaces.

In the Examples, the heat fixing roll was made as shown in FIG. 4. Since the polysiloxane primer (adhesive) composition has a strong adhesion to silicone rubber even in the presence of silicone oil, it is possible to make a fuser roll in accordance with this invention wherein the silicone rubber layer is impregnated with a silicone oil.

Moreover, the fuser roll of the invention may be used as either a fuser roll or a pressure roll. Hence, the fuser roll can be attached to a pressure contact-type fuser assembly wherein both the fuser and pressure rolls are heated. In addition, it will be apparent to those skilled in the art that the fuser roll of this invention may be used as a fuser roll having an external heating source.

As will be understood from the foregoing detailed description, the fuser roll of the invention comprises a roll body, a polysiloxane composition layer exhibiting excellent adhesiveness to silicone rubber and resistances to both heat and silicone oil and formed around the roll body, and a silicone rubber layer formed around the polysiloxane composition and that the fuser rolls of this invention have a longer life than conventional fuser rolls. Conventional application of the layers to the base member can be used to form the fuser member. These techniques are well known by one skilled in the art.

The polysiloxane composition can be further improved by adding thereto an amount of ferric oxide, cerium oxide, and equivalent materials or mixtures thereof in an amount ranging from about 0.1 to about 10 percent by weight of the polysiloxane adhesive composition.

The silicone rubbers useful in this invention are conventional commercial rubbers described above. The silicone rubbers or elastomers may be cross-linked on the fuser member by techniques well known in the art, such as with benzoyl peroxide or other free radical initiators, with or without catalyst.

The organopolysiloxanes in the polysiloxane adhesive or primer composition are those polysiloxanes having substituted or unsubstituted monovalent hydrocarbon groups. They may be substituted with any of the well-known groups such as the halogens, e.g., chlorine, nitrogen-containing materials such as amino groups, and the like. In the organopolysiloxane fraction wherein at least 80 mole percent is methyl groups, an aliphatic unsaturated group may be optionally present in an amount from 0.0 percent up to about 0.2 mole percent. Exemplary of the aliphatic unsaturated groups are vinyl, allyl, and the like, groups including the vinyldimethylsilyl group and other well-known substituted, unsaturated aliphatic groups. This viscosity of this fraction of the polysiloxane composition must be greater than 100,000 centistokes at 25° C. Although there is no critical upper limit, the preferred viscosity range is about 100,000 to about 350,000 centistokes at 25° C.

The organosiloxane fraction having about 3.0 to 25.0 mole percent of a vinyl group, comprise a substituted or non-substituted monovalent hydrocarbon group, such as methyl, ethyl, propyl, butyl and the like, and substituted derivatives thereof, such as the substituted groups discussed above. The vinyl groups may comprise any conventional vinyl group or substituted vinyl such as vinyl silanes. Exemplary of these materials is methylvinylpolysiloxane.

The polysiloxane primer composition also comprises a designated class of silane compounds having unsaturated hydrocarbon groups designated as $R^3$ in the formula $R^3Si(OR^4)_3$. These unsaturated hydrocarbon groups include vinyl, allyl and equivalent unsaturated hydrocarbon groups well known in the art.

The allyl ester of a polybasic acid of the polysiloxane primer composition includes diallyl succinate, diallyl maleate, diallyl adipate, and the like. The aliphatic acid salt of a metal fraction of the polysiloxane primer composition includes tin octoate, sodium propionate, sodium formate, sodium ethylate, potassium acetate, and the like. The foregoing fractions are well known in the art and substitutions for the foregoing fractions can be easily substituted by one skilled in the art.

While the invention has been described with respect to preferred embodiments, it will be apparent that certain modifications and changes can be made without departing from the spirit and scope of the invention and therefore, it is intended that the foregoing disclosure be limited only by the claims appended hereto.

What is claimed is:

1. A fuser member for pressure fusing electrostatic toner images at elevated temperatures comprising a substrate coated with at least one layer of a heat resistant silicone rubber and having a polysiloxane composition intermediate the silicone rubber layer and the substrate, said polysiloxane composition having improved adherence to said substrate and said silicone rubber and having resistance to heat and silicone oil degradation, and comprising:
   a. 100 parts by weight of an organopolysiloxane of the formula, $R^1_n SiO_{4-n/2}$ wherein $R^1$ is a substituted or unsubstituted monovalent hydrocarbon group, at least 80 mole percent of $R^1$ being a methyl group and having an aliphatic unsaturated group in an amount not more than 0.2 mole percent, and were $n$ is a positive integer of from 1.98 to 2.01, and having a viscosity greater than 100,000 centistokes at 25° C;
   b. 5 – 100 parts by weight of an organopolysiloxane of the formula, $R^2 SiO_{4-m/2}$ wherein $R^2$ is a substituted or unsubstituted monovalent hydrocarbon group, about 3 to 25 mole percent of the total $R^2$ being a vinyl group, and where $m$ is a positive integer from 1.9 to 2.3, and having a viscosity of from about 5 to 10,000 centistokes at 25° C;
   c. 10 to 80 parts by weight of an allyl ester of a polybasic acid;
   d. 3 to 20 parts by weight of an aliphatic acid salt of a metal; and
   e. 0.2 to 20 parts by weight of a silane compound expressed by a general formula, $R^3 Si(OR^4)_3$ wherein $R^3$ is an unsaturated hydrocarbon group and $R^4$ is a member selected from the group consisting of a methyl group, an ethyl group, a β-methoxyethyl group and a β-ethoxyethyl group, and partially hydrolyzed products thereof.

2. The fuser member of claim 1 wherein the polysiloxane composition further comprises ferric oxide.

3. The fuser member of claim 1 wherein the polysiloxane composition further comprises cerium oxide.

4. The fuser member of claim 1 further comprising multiple layers of heat-resistant silicone rubber and having said polysiloxane composition intermediate said silicone rubber layers.

5. A method of adhering a heat-resistant silicone rubber layer to a base member comprising applying at least one layer of a polysiloxane composition intermediate the base member and the silicone rubber layer, said polysiloxane composition comprising:
   a. 100 parts by weight of an organopolysiloxane of the formula, $R^1_n SiO_{4-n/2}$ wherein $R^1$ is a substituted or unsubstituted monovalent hydrocarbon groups, at least 80 mole percent of $R^1$ being a methyl group and having an aliphatic unsaturated group in an amount not more than 0.2 mole percent, and where $n$ is a positive integer of from 1.98 to 2.01, and having a viscosity greater than 100,000 centistokes at 25° C;
   b. 5 – 100 parts by weight of an organopolysiloxane of the formula, $R^2 SiO_{4-m/2}$ wherein $R^2$ is a substituted or unsubstituted monovalent hydrocarbon group, about 3 to 25 mole percent of the total $R^2$ being a vinyl group, and where $m$ is a positive integer from 1.9 to 2.3, and having a viscosity of from about 5 to 10,000 centistokes at 25° C;
   c. 10 to 80 parts by weight of an allyl ester of a polybasic acid;
   d. 3 to 20 parts by weight of an aliphatic acid salt of a metal; and
   e. 0.2 to 20 parts by weight of a silane compound expressed by a general formula, $R^3 Si(OR^4)_3$ wherein $R^3$ is an unsaturated hydrocarbon group and $R^4$ is a member selected from the group consisting of a methyl group, an ethyl group, a β-methoxyethyl group and a β-ethoxyethyl group, and partially hydrolyzed products thereof.

6. The method of claim 5 wherein the polysiloxane composition further comprises ferric oxide.

7. The method of claim 5 wherein the polysiloxane composition further comprises cerium oxide.

8. The method of claim 5 further comprising applying at least one additional silicone rubber layer to the silicone rubber layer on the base member and adhering said additional silicone rubber layer with a layer of polysiloxane composition intermediate the silicone rubber layers.

* * * * *